United States Patent
Irokawa et al.

(10) Patent No.: US 6,171,066 B1
(45) Date of Patent: Jan. 9, 2001

(54) AUTOMATIC PNEUMATIC PRESSURE CONTROL APPARATUS AND METHOD OF CONTROLLING SAME

(75) Inventors: Kenji Irokawa; Tomohiko Aki, both of Ibaraki-ken (JP)

(73) Assignee: SMC Kabushiki Kaisha, Tokyo (JP)

(*) Notice: Under 35 U.S.C. 154(b), the term of this patent shall be extended for 0 days.

(21) Appl. No.: 09/093,196

(22) Filed: Jun. 8, 1998

(30) Foreign Application Priority Data

Jun. 9, 1997 (JP) ................................................... 9-150916

(51) Int. Cl.[7] .................................................. F04B 49/06
(52) U.S. Cl. ......................... 417/44.2; 417/12; 323/19; 364/105; 364/162; 364/164; 364/157; 137/84; 137/85; 62/222.5; 318/610
(58) Field of Search ..................... 417/12, 44.2; 323/19; 364/105, 162, 164, 157; 137/84, 85; 62/228.5, 222.5; 318/610; 419/307; 236/49

(56) References Cited

U.S. PATENT DOCUMENTS

| | | | |
|---|---|---|---|
| 3,611,115 | * 10/1971 | Friedbach | 323/19 |
| 4,214,300 | * 7/1980 | Barlow et al. | 364/105 |
| 4,279,192 | 7/1981 | Kleinwaks . | |
| 4,579,137 | * 4/1986 | Brandt, Jr. | 137/85 |
| 4,637,546 | * 1/1987 | DeMeyer | 236/49 |
| 4,756,669 | * 7/1988 | Hata | 417/12 |
| 4,804,009 | * 2/1989 | Bergmann | 137/84 |
| 4,834,622 | * 5/1989 | Schuh | 419/307 |
| 4,903,192 | * 2/1990 | Saito et al. | 364/157 |
| 5,093,609 | 3/1992 | Sakamoto et al. . | |
| 5,162,987 | 11/1992 | Sambhu . | |
| 5,325,288 | * 6/1994 | Satou | 364/162 |
| 5,331,541 | * 7/1994 | Ueda et al. | 364/164 |
| 5,384,526 | * 1/1995 | Bennett | 318/610 |
| 5,493,488 | 2/1996 | Castle et al. . | |
| 5,532,925 | 7/1996 | Gassman . | |
| 5,745,362 | * 4/1998 | Hiroi et al. | 364/162 |
| 5,950,443 | * 9/1999 | Meyer et al. | 62/228.5 |

FOREIGN PATENT DOCUMENTS

| | | |
|---|---|---|
| 7-4401 | 1/1995 | (JP) . |
| 7-310843 | 11/1995 | (JP) . |
| WO 93/18445 | 9/1983 | (WO) . |

OTHER PUBLICATIONS

Invensys Building Systems, Basics of PID Control, http://www.siebe–env–controls.com/news/links/pid.htm, pp. 1–5, Jan. 1996.*

Control Engineering Online, Vance J. VanDoren, Self–Tuning Controllers AutoSelct P, I, D Values, http://www.controleng.com/archives/1997/ct10901.97/09bbas.htm, pp. 1–2, Sep. 1997.*

Patent Abstracts of Japan, vol. 17, No. 139 (M–1385), Mar. 22, 1993, JP 04–316701, Nov. 9, 1992.

* cited by examiner

Primary Examiner—Timothy S. Thorpe
Assistant Examiner—Steven Brown
(74) Attorney, Agent, or Firm—Oblon, Spivak, McClelland, Maier & Neustadt, P.C.

(57) ABSTRACT

When a steplike reference signal is supplied while a switch is open, an offset signal for compensating for the dead time of a pneumatic device is generated by an offset generator and supplied as a manipulated variable for the pneumatic device. When a feedback increases in level and a speed higher than a reference speed is detected by a speed detector, the switch is closed by a switching signal, switching from a PD control mode to a PID control mode. The pneumatic device thus controlled has a reduced response time and can made a quick response.

16 Claims, 7 Drawing Sheets

US 6,171,066 B1

AUTOMATIC PNEUMATIC PRESSURE CONTROL APPARATUS AND METHOD OF CONTROLLING SAME

BACKGROUND OF THE INVENTION

1. Field of the Invention

The present invention relates to an automatic pneumatic pressure control apparatus for use as an electropneumatic transducer or a pneumatic pressure actuator employing such an electropneumatic transducer, and a method of controlling such an automatic pneumatic pressure control apparatus.

2. Description of the Related Art

Electropneumatic transducers constitute one category of automatic pneumatic pressure control apparatus which are actuated by an electric input signal supplied as a manipulated variable (also referred to as a "manipulated variable signal") according to an automatic control process. In response to the electric input signal, the electropneumatic transducer generates a pneumatic pressure as an output signal known as a controlled variable or a controlled variable signal, and an electric signal corresponding to the pneumatic pressure is fed back to the electropneumatic transducer.

A flow control valve or the like is connected to an outlet port of the electropneumatic transducer, making up a pneumatic pressure actuator as an automatic pneumatic pressure control apparatus. In response to an electric input signal (manipulated variable) applied to the electropneumatic transducer, the pneumatic pressure actuator produces an output signal (controlled variable) representing the opening of the valve member of the flow control valve, and the output signal is fed back to the pneumatic pressure actuator.

One known automatic pneumatic pressure control apparatus is disclosed in Japanese laid-open patent publication No. 7-4401 entitled "Electropneumatic transducer apparatus and actuator system employing same", filed by the present applicant.

Generally, automatic pneumatic pressure control apparatus employ the principles of the PID (Proportional plus Integral plus Derivative) control mode. According to the PID control mode, an offset-free, stable, and accurate response can be achieved when supplied with a signal that changes stepwise from a value "0" to a value "1", such as a step signal (step input), for example, as a reference signal (also referred to as a "reference input" or an "input signal").

Pneumatic devices suffer a longer dead time which is consumed after a manipulated variable is supplied until a controlled variable is actually generated by a controlled object, than hydraulic devices. If the controlled object has a large dead time, then the overall follow-up controllability of the pneumatic devices is poor. Specifically, if the manipulated variable (and hence the controlled variable) is smaller, then a time required until the controlled object responds is longer, i.e., the controlled object responds slowly, and if the manipulated variable (the controlled variable) is larger, an overshoot or a damped oscillation tends to occur in the controlled object.

SUMMARY OF THE INVENTION

It is therefore an object of the present invention to provide an automatic pneumatic pressure control apparatus which makes a response time shorter (allows a quicker response) when a manipulated variable (a controlled variable) is smaller, and which is substantially free of an overshoot or a damped oscillation when the manipulated variable (the controlled variable) is larger, and a method of controlling such an automatic pneumatic pressure control apparatus.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
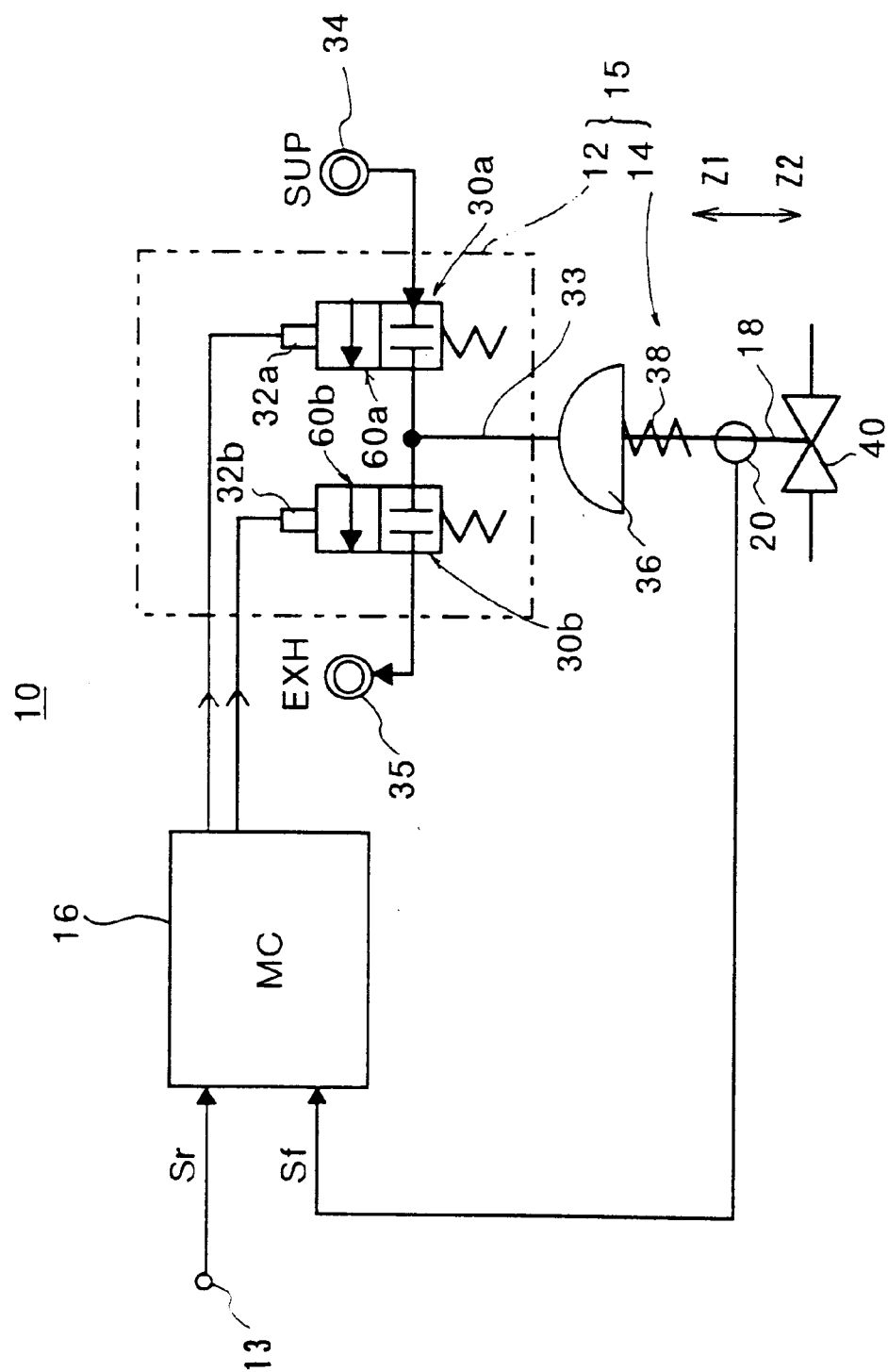
FIG. 1 is a circuit diagram, partly in block form, an automatic pneumatic pressure control apparatus according to an embodiment of the present invention.

Like or corresponding parts are denoted by like or corresponding reference characters throughout views.

As shown in FIG. 1, an automatic pneumatic pressure control apparatus 10 according to an embodiment of the present invention incorporates a pneumatic device 15 which generally comprises an electropneumatic transducer 12 and a pneumatic actuator 14 that can be controlled by the electropneumatic transducer 12.

More specifically, the automatic pneumatic pressure control apparatus 10 basically comprises a microcomputer 16 for being supplied with a reference signal Sr corresponding to a setpoint through an input terminal 13, the electropneumatic transducer 12 operable by a manipulated variable signal which is an output signal from the microcomputer 16, the pneumatic actuator 14 operable by an output signal (pneumatic pressure) from the electropneumatic transducer 12, and a position detector 20 for detecting a distance by which a stem 18 of the pneumatic actuator 14 is displaced, as a controlled variable signal, converting the controlled variable signal into an electric signal (feedback signal) Sf, and transmitting the electric signal Sf to the microcomputer 16.

The electropneumatic transducer 12 comprises a pair of identical electropneumatic transducer units 30a, 30b. The electropneumatic transducer unit 30a has an input port supplied with compressed air from an inlet port 34 connected to a pneumatic pressure supply SUP, and an output port connected to an input port of the electropneumatic transducer unit 30a. The electropneumatic transducer unit 30b has an output port connected to an exhaust port 35 which is vented to the atmosphere.

The electropneumatic transducer units 30a, 30b have respective nozzle flapper mechanisms 32a, 32b which are supplied with the manipulated variable signal from output drivers as output interfaces of the microcomputer 16.

The output port of the electropneumatic transducer unit 30a and the input port of the electropneumatic transducer unit 30b are interconnected by a pipe 33 that is coupled to a diaphragm chamber 36 of the pneumatic actuator 14, which serves to control the valve opening of a flow control valve 40.

When a pneumatic pressure is supplied from the inlet port 34 through the electropneumatic transducer unit 30a and the pipe 33 into the diaphragm chamber 36, thereby developing a pressure buildup in the diaphragm chamber 36, the stem 18 is displaced in the direction indicated by the arrow Z2 against the bias of a compression spring 38, tending to open the flow control valve 40. When a pneumatic pressure is discharged from the diaphragm chamber 36 through the pipe 33 and the electropneumatic transducer unit 30b into the exhaust port 35, thereby causing a pressure reduction in the diaphragm chamber 36, the stem 18 is displaced in the direction indicated by the arrow Z1 under the bias of the compression spring 38, tending to close the flow control valve 40. In this manner, the degree of opening of the flow control valve 40 is adjusted.

When the electropneumatic transducer unit 30a connected to the inlet port 34 is closed and the electropneumatic transducer unit 30b connected to the exhaust port 35 is open, thus venting the diaphragm chamber 36 to the atmosphere, the stem 18 is held in a home position at the limit end in the direction indicated by the arrow Z1 under the bias of the compression spring 38. In this position, the flow control valve 40 is fully closed.

The distance by which the stem 18 is displaced, or the degree of opening of the flow control valve 40, or the rate of a fluid flowing through the flow control valve 40 represents a controlled variable. An electric output signal generated by the position detector 20 in proportion to the controlled variable is supplied as the feedback signal Sf to the microcomputer 16.

In the automatic pneumatic pressure control apparatus 10 shown in FIG. 1, the reference signal Sr may be considered to be a signal for determining the degree of opening of the flow control valve 40 or the rate of a fluid flowing through the flow control valve 40.

The microcomputer 16 functions as energizing, controlling, processing, and deciding means. As well known in the art, the microcomputer 16 comprises a microprocessor (MPU) corresponding to a central processing unit (CPU), an A/D converter and a D/A converter as input/output interfaces connected to the microprocessor, output drivers as output interfaces, I/O ports, a read-only memory (ROM) storing a control program, a system program, and look-up tables, a random-access memory (RAM as a write/read memory) for temporarily storing processed data, a timer circuit, and an interrupt processing circuit. The microcomputer 16 is in the form of an LSI device with the above components integrated on one chip. The functions performed by the microcomputer 16 will be described later on.

Figure 2:
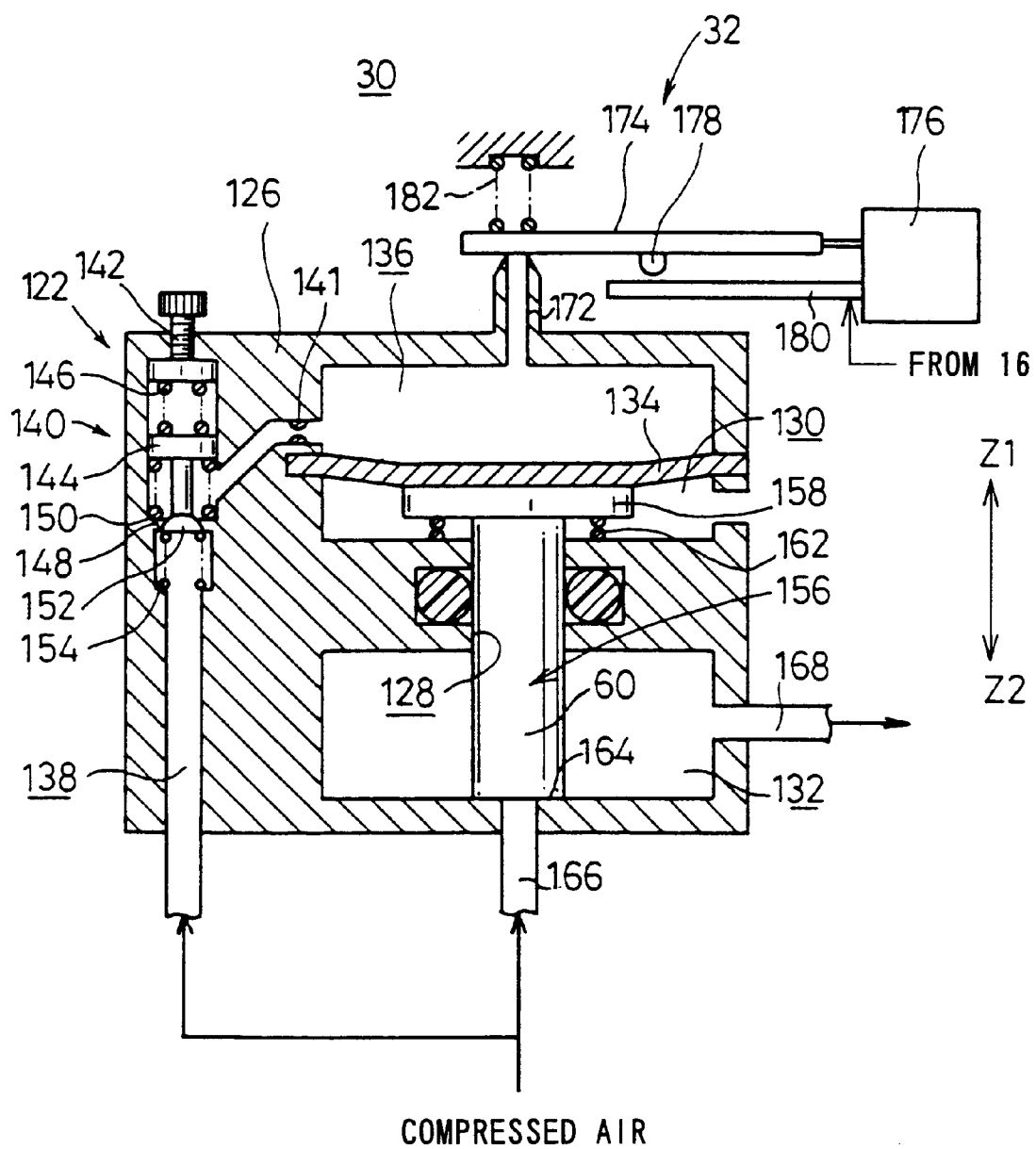
FIG. 2 is a cross-sectional view of an electropneumatic transducer unit in the automatic pneumatic pressure control apparatus shown in FIG. 1.

FIG. 2 shows in cross section each of the electropneumatic transducer units 30a, 30a. Since the electropneumatic transducer units 30a, 30b are identical in structure to each other, they will be referred to collectively as an electropneumatic transducer unit 30. Though parts of the electropneumatic transducer units 30a, 30b are denoted by reference numerals with suffixes "a", "b" in FIG. 1, these suffixes "a", "b" will be omitted if the electropneumatic transducer unit 30 is described.

The electropneumatic transducer unit 30 shown in FIG. 2 is disclosed in Japanese laid-open patent publication No. 7-4401. The structure and operation of the electropneumatic transducer unit 30 will be described below.

The electropneumatic transducer unit 30 comprises a nozzle flapper mechanism 32 and a valve mechanism 122.

The valve mechanism 122 comprises a housing 126 having a first chamber 130 and a second chamber 132 which are defined therein and communicate with each other through a hole 128. A diaphragm 134 is disposed in the first chamber 130, dividing the first chamber 130 into a lower compartment and an upper compartment which serves as a nozzle back pressure chamber 136. The nozzle back pressure chamber 136 communicates with a supply passage 138 defined in the housing 126 and connected to a compressed air supply (not shown). The supply passage 138 accommodates therein a pressure reducing valve 140 and a fixed restriction 141. The pressure reducing valve 140 has a knob 142 threaded in the housing 126, a piston 144 slidably disposed in the supply passage 138, and a first spring 146 acting on the piston 144 and connected to the knob 142. When the knob 142 is manually turned, the bias of the first spring 146 is adjusted. A valve body 152 which can be seated on a valve seat 148 is also disposed in the supply passage 138. A second spring 150 is interposed between the piston 144 and the valve seat 148. The valve body 152 is held against a shank of the piston 144 by a third spring 154 which is disposed in the supply passage 138 beneath the valve seat 148. The piston 144 has a cross-sectional area greater than the cross-sectional area of the valve body 152.

If the pneumatic pressure in the nozzle back pressure chamber 136 is higher than the pneumatic pressure of the compressed air supply connected to the supply passage 138, then since the cross-sectional area of the piston 144 is greater than the cross-sectional area of the valve body 152, the piston 144 is urged upwardly, and the valve body 152 biased by the third spring 154 is also displaced upwardly until it is seated on the valve seat 148, disconnecting the nozzle back pressure chamber 136 from the compressed air supply. If the pneumatic pressure in the nozzle back pressure chamber 136 is lower than the pneumatic pressure of the compressed air supply, the valve body 152 is unseated off the valve seat 148 under the bias of the first spring 146, bringing the nozzle back pressure chamber 136 into pneumatic communication with the compressed air supply.

A valve assembly 156 disposed in the first chamber 130 and the second chamber 132 comprises a flange 158 positioned in the lower compartment of the first chamber 130 and a cylindrical rod (valve body) 60 extending downwardly from the flange 158 through the hole 128 into the second chamber 132 and axially movable in the hole 128. The flange 158 is held against the diaphragm 134 under the bias of a spring 162. When the diaphragm 134 is displaced, the cylindrical rod 60 is seated on or unseated off a valve seat 164 at the bottom of the second chamber 132. A supply passage 166 communicates with the second chamber 132 through the valve seat 164, and an exhaust passage 168 also communicates with the second chamber 132 through a side wall thereof. Therefore, pneumatic communication between the supply passage 166 and the exhaust passage 168 can be controlled by the cylindrical rod 60 because the cylindrical rod 60 closes the supply passage 166 when seated on the valve seat 164 and opens the supply passage 166 when unseated off the valve seat 164.

The nozzle flapper mechanism 32 comprises a nozzle 172 communicating with the nozzle back pressure chamber 136, a flapper 174 held against a distal end of the nozzle 172, a support 176 by which the flapper 174 is displaceably supported, a bimorph piezoelectric element 180 mounted on the support 176 and spaced a distance from a projection 178 on a lower surface of the flapper 174, and a spring 182 which normally urges the flapper 174 toward the nozzle 172. The bimorph piezoelectric element 180 is bent toward the flapper 174 when supplied with a positive voltage from the microcomputer 16, and is bent away from the flapper 174 when supplied with a negative voltage from the microcomputer 16.

Figure 3:
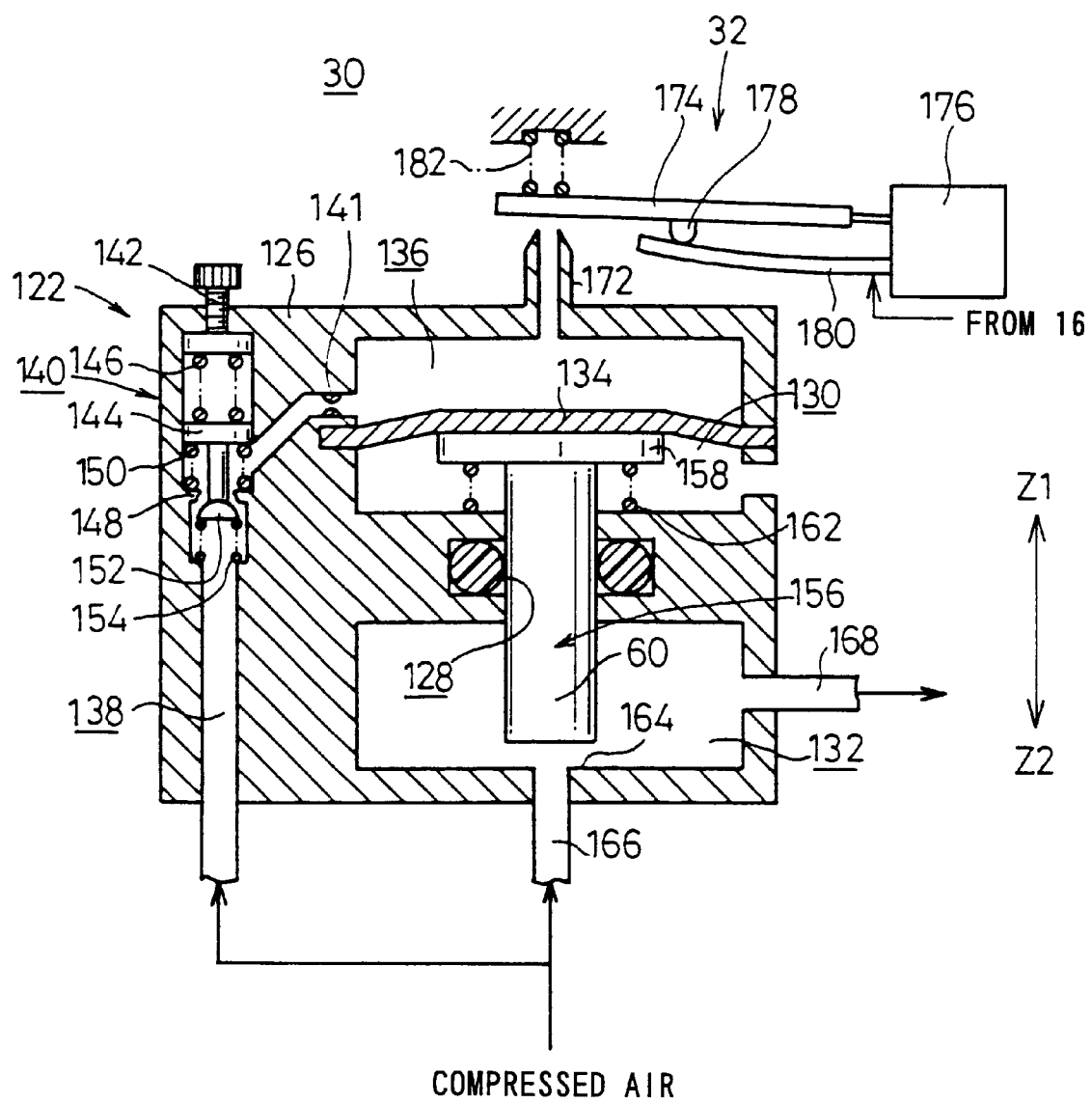
FIG. 3 is a cross-sectional view illustrating the manner in which the electropneumatic transducer shown in FIG. 2 operates.

Specifically, when a positive pulse is applied from the microcomputer 16 to the bimorph piezoelectric element 180, the bimorph piezoelectric element 180 is bent upwardly into contact with the projection 178 and presses the flapper 174 upwardly, as shown in FIG. 3. Therefore, the flapper 174 is spaced from the nozzle 172 against the bias of the spring 182. Since the nozzle 172 is opened, the pneumatic pressure in the nozzle back pressure chamber 136 is lowered, allowing the diaphragm 134 to be displaced upwardly in the direction indicated by the arrow Z1. The valve assembly 156 is also displaced in the direction indicated by the arrow Z1 under the bias of the spring 162 acting on the flange 158. As a result, the cylindrical rod 60 is unseated off the valve seat 164, allowing pneumatic communication between the supply passage 166 and the exhaust passage 168.

When a negative pulse is applied from the microcomputer 16 to the bimorph piezoelectric element 180, the bimorph piezoelectric element 180 is spaced from the projection 178, and the flapper 174 is brought into abutment against the nozzle 172 under the bias of the spring 182, as shown in FIG. 2. Since the nozzle 172 is closed, the pneumatic pressure in the nozzle back pressure chamber 136 is increased, displacing the diaphragm 134 and the flange 158 downwardly in the direction indicated by the arrow Z2 against the bias of the spring 162. As a result, the cylindrical rod 60 is seated on the valve seat 164, cutting off pneumatic communication between the supply passage 166 and the exhaust passage 168.

For adjusting the position of the stem 18 to a desired position to open the flow control valve 40 to a desired level, the reference signal Sr is changed stepwise from a value "0" to a value "1" corresponding to the desired level.

The microcomputer 16 supplies an output signal not to actuate the nozzle flapper mechanism 32b of the electropneumatic transducer unit 30b connected to the exhaust port 35. Therefore, the valve body 60b of the electropneumatic transducer unit 30b is in the cut-off position. The nozzle flapper mechanism 32a of the electropneumatic transducer unit 30a is actuated by an output signal from the microcomputer 16 according to a PWM (Pulse Width Modulation) process disclosed in Japanese laid-open patent publication No. 7-4401. According to the PWM process, when the reference signal Sr is changed stepwise from the value "0" to the value "1", the pulse duration in each cycle is initially wider and subsequently progressively smaller. A feedback control process is carried out to move the stem 18 smoothly in the direction indicated by the arrow Z2 and stop the stem 18 exactly at a desired position corresponding to the value "1" of the reference signal Sr.

For returning the stem 18 to the original position, the reference signal Sr is changed back stepwise from the value "1" to the value "0". At this time, the microcomputer 16 inactivates the nozzle flapper mechanism 32a of the electropneumatic transducer unit 30a connected to the inlet port 34, bringing the valve body 60a of the electropneumatic transducer unit 30a into the cut-off position. Immediately thereafter, the microcomputer 16 actuates the nozzle flapper mechanism 32b of the electropneumatic transducer unit 30b according to the PWM process. At this time, a feedback control process is also carried out to move the stem 18 smoothly in the direction indicated by the arrow Z1 and stop the stem 18 exactly at a desired position corresponding to the value "0" of the reference signal Sr.

Figure 4:
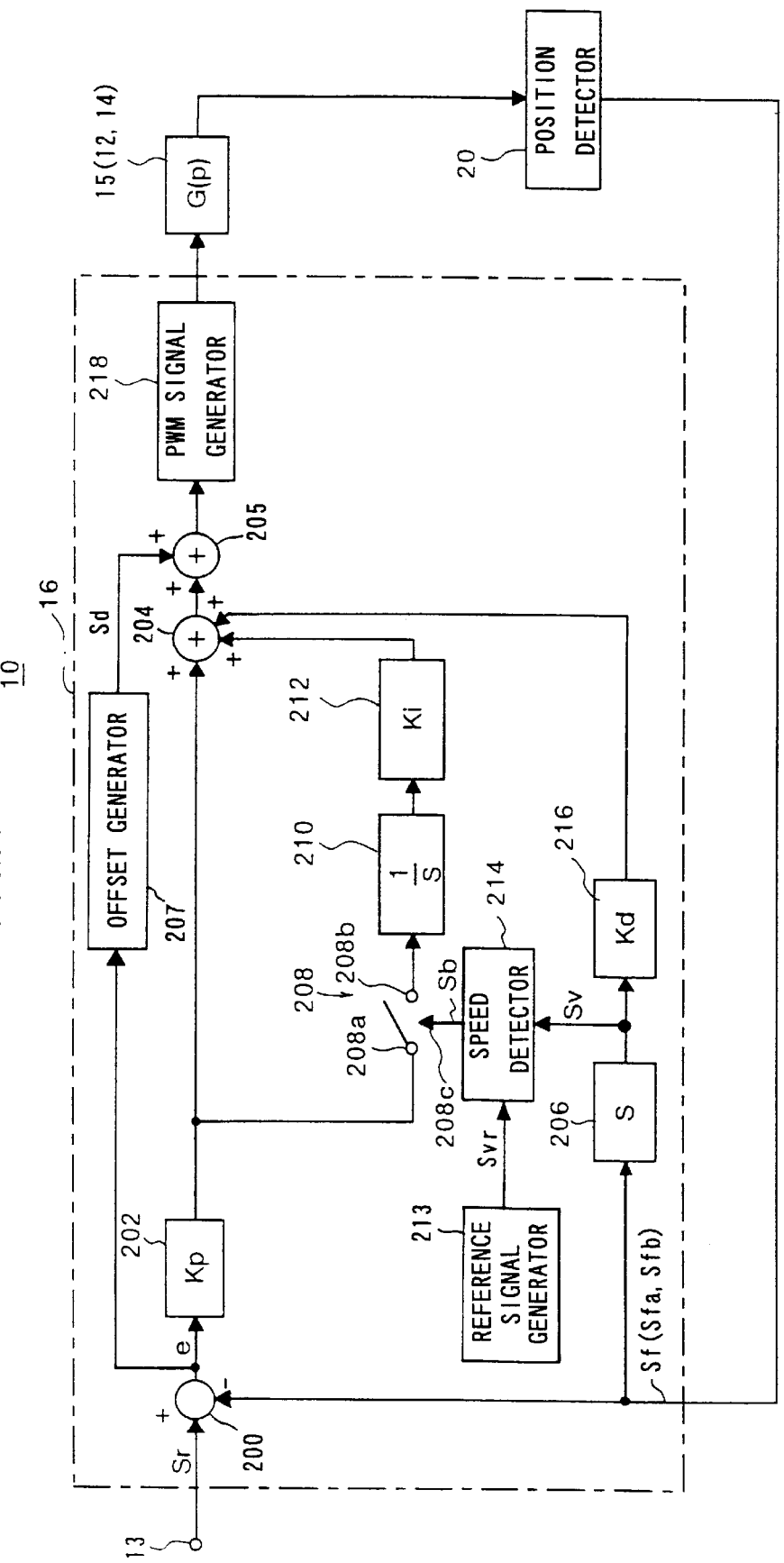
FIG. 4 is a block diagram of a control system arrangement of the automatic pneumatic pressure control apparatus shown in FIG. 1.

FIG. 4 shows in block form a control system arrangement of the automatic pneumatic pressure control apparatus shown in FIG. 1. In FIG. 4, the reference numeral 15 represents the pneumatic device 15 which comprises the electropneumatic transducer 12 and the pneumatic actuator 14, the pneumatic device 15 having a transfer function G(p), and the reference numeral 20 represents the position detector 20 for detecting the position of the stem 18 and hence the degree of opening of the flow control valve 40, the position detector 20 being capable of converting the position of the stem 18 as the controlled variable into an electric signal referred to as a feedback signal Sf. The functions performed by the microcomputer 16 are shown as various blocks surrounded by the dot-and-dash line in FIG. 4.

The reference signal Sr from the input terminal 13 and the feedback signal Sf from the position detector 20 are supplied to a comparator 200, which outputs an error signal e (e=Sr−Sf) to a proportional element 202 having a proportional gain Kp. The comparator 200 functions as a subtracting means having a subtracted terminal which is supplied with the reference signal Sr and a subtracting terminal which is supplied with the feedback signal Sf.

The proportional element 202 which is supplied with the error signal e as an operating signal has its output terminal connected to a first input terminal of an adder 204 and a movable terminal 208a of a switch 208.

The switch 208 has a fixed terminal 208b connected to a second input terminal of the adder 204 through an integration element 210 expressed by an operator "1/S" and a proportional element 212 expressed by an integration proportionality coefficient Ki.

The feedback signal Sf is also supplied to a differentiation element (speed element) 206 expressed by an operator "S". A speed signal Sv outputted from the differentiation element 206 is supplied to a speed detector 214 and also to a proportional element 216 expressed by a differentiation proportionality coefficient Kd. The speed signal Sv is supplied from the proportional element 216 to a third input terminal of the adder 204.

The speed detector 214 compares the speed signal Sv with a predetermined value (also referred to as a "threshold speed signal", a "reference signal", a "reference speed", or a "reference value") Svr from a reference signal generator 213, and supplies a switching signal Sb produced as a binary signal (on/off signal) as the result of comparing the signals Sv, Svr, to a control terminal 208c of the switch 208. The switching signal Sb controls the opening and closing the switch 208. Specifically, the switch 208 is opened when the switching signal Sb is of a low level, and closed when the switching signal Sb is of a high level.

An output signal from the adder 204 is supplied to an input terminal of an adder 205, whose other input terminal is supplied with an offset signal Sd from an offset generator 207. The offset signal Sd is set to such a value as to compensate for a pre-measured dead time of the pneumatic device 15 as a controlled object. The adders 204, 205 may be replaced with a single four-input adder.

The offset generator 207 is supplied with the error signal e which serves as a trigger signal for generating the offset signal Sd and also as a trigger signal for eliminating the offset signal Sd.

An output signal from the adder 205, i.e., the sum of the offset signal Sd and a manipulated variable signal according to a PD control mode based on the output signals from the proportional element 202 and the differentiation element 206 with the switch 208 being open, or the sum of the offset signal Sd and a manipulated variable signal according to a PID control mode based on the output signals from the proportional element 202, the integration element 210, and the differentiation element 206 with the switch 208 being closed, is supplied through a PWM signal generator 218 to the electropneumatic transducer 12 of the pneumatic device 15.

For an easier understanding of the present invention, it is assumed that the electropneumatic transducer units 30a, 30b are alternately actuated, i.e., toggled, by the microcomputer 16.

Specifically, when a drive signal as a manipulated variable signal is supplied from the PWM signal generator 218 of the microcomputer 16 to the nozzle flapper mechanism 32a, such a drive signal as a manipulated variable signal is not supplied to the nozzle flapper mechanism 32b. When not supplied with a drive signal, the valve body 60 (60b) combined with the nozzle flapper mechanism 32b is in the cut-off position as shown in FIG. 2.

Operation of the automatic pneumatic pressure control apparatus 10 shown in FIGS. 1 through 4 will be described below with reference to FIG. 5. For an understanding of the operation of the control system arrangement, it is assumed that input and output terminals of the PWM signal generator 218 and the position detector 20 are short-circuited for the sake of brevity.

For an easier understanding of the operation of the control system arrangement, switching from the PD mode to the PID mode when the offset signal Sd is not generated will first be described below, and then switching from the PD mode to the PID mode when the offset signal Sd is generated will be described thereafter.

Switching from the PD mode to the PID mode when the offset signal Sd is not generated will first be described below with reference to FIG. 5.

Figure 5:
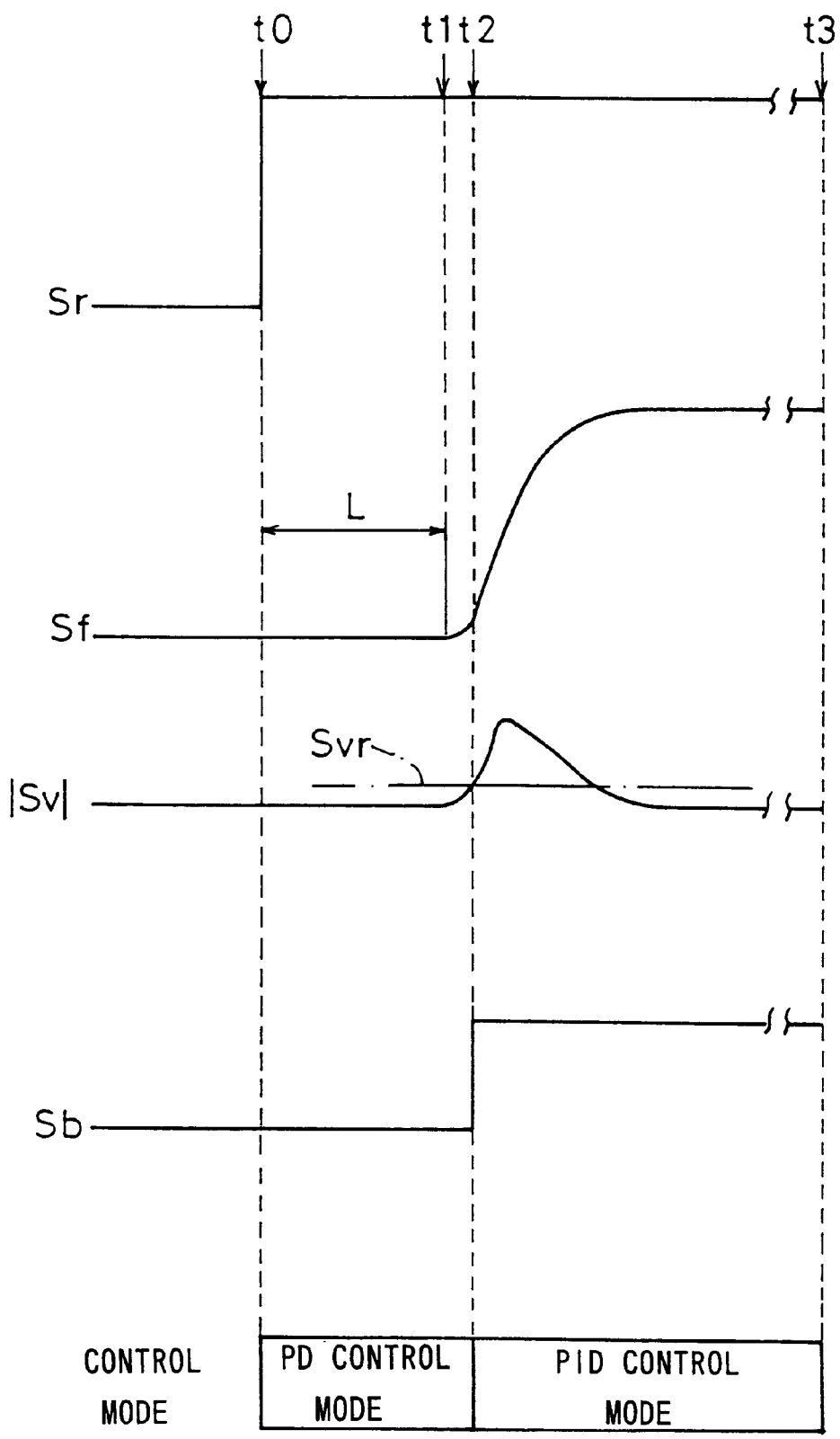
FIG. 5 is a diagram of waveforms illustrative of the manner in which the automatic pneumatic pressure control apparatus shown in FIG. 1 and the control system arrangement shown in FIG. 4 operate free of offset control.

As shown in FIG. 5, a reference signal Sr which changes stepwise from a low level to a high level is supplied from the input terminal 13 to the comparator 200 at a time t0. At this time, the switch 208 is open as shown in FIG. 4 with the switching signal Sb being of a low level. Therefore, the PD control mode is carried out by the proportional element 202 and the differentiation element 206, starting to actuate the electropneumatic transducer unit 30a at the time t0.

Since no drive signal is supplied from the microcomputer 16 to the electropneumatic transducer unit 30b at this time, the valve body 60b is in the cut-off position. The nozzle flapper mechanism 32a of the electropneumatic transducer unit 30a is actuated to bring the valve body 60a into the open position.

The valve body 60a is brought into the open position as follows. When a positive pulse is applied to the bimorph piezoelectric element 180, the nozzle flapper mechanism 32 is actuated to move the flapper 174 away from the nozzle 172, venting the nozzle back pressure chamber 136 to the atmosphere. Strictly, there is a dead time consumed after the positive pulse is applied to the bimorph piezoelectric element 180 until the flapper 174 opens the nozzle 172 against the bias of the spring 182. After the nozzle back pressure chamber 136 is vented to the atmosphere, there is also a dead time consumed until the valve body 142 is unseated off the valve seat 148 under the bias of the first spring 146. Another dead time is consumed until the diaphragm 134 moves in the direction indicated by the arrow Z1.

In this manner, the valve body 60a is brought into the open position, allowing compressed air to be supplied from the inlet port 34 through the electropneumatic transducer unit 30a and the pipe 33 into the diaphragm chamber 36.

There is further a dead time consumed after the compressed air is introduced into the diaphragm chamber 36 until the stem 18 starts moving in the direction indicated by the arrow Z2 against the bias of the compression spring 38.

These dead times, spent after the nozzle flapper mechanism 32a of the electropneumatic transducer unit 30a is actuated until the stem 18 for determining a degree of opening of the flow control valve 40 actually starts to move, are represented by a time L (see FIG. 5) from the time t0 to a time t1. No integral control mode (I control mode) is effected during the time L from the time t0 to the time t1 because the switch 208 is opened.

Actually, since no change is developed in the feedback signal Sf in the period the time t0 to the time t1, a proportional control mode (P control mode) is essentially carried out. Therefore, the P control mode may be effected rather than the PI control mode in the period the time t0 to the time t1.

When the stem 18 starts moving in the direction indicated by the arrow Z1 at the time t1, the speed signal Sv starts to increase from a value "0" as shown in FIG. 5. When the absolute value |Sv| of the speed signal Sv exceeds the predetermined value Svr at a time t2, the switching signal Sb outputted from the speed detector 214 changes from a low level to a high level, changing the switch 208 from an open state to a closed state.

After the time t2, the PD control mode carried out by the proportional element 202 and the differentiation element 206 changes to the PID control mode carried by the carried out by the proportional element 202, the differentiation element 206, and the integration element 210.

The speed signal Sv is essentially of the value "0" up to the time t2. Therefore, the PD control mode may be replaced with the P control mode from the time t0 to the time t2.

After the time t2, when the value of the feedback signal Sf approaches the high level of the reference signal Sr, the absolute value |Sv| of the speed signal Sv becomes smaller than the reference value Svr. At this time, the switch 208 is not operated. Therefore, the PD control mode changes to the PID control mode when the absolute value |Sv| of the speed signal Sv increases across the reference value Svr, but the PID control mode is sustained when the absolute value |Sv| of the speed signal Sv decreases across the reference value Svr.

When the reference signal Sr increases or decreases stepwise at a time t3, the switch 208 is reset to the open state as shown in FIG. 4, whereupon the PID control mode changes back to the PD control mode.

As described above, when the reference signal Sr changes stepwise, the switch 208 is open, and the pneumatic device 15 starts being actuated under the P control mode or the PD control mode for the dead time L. After elapse of the dead time L, when the controlled variable changes to produce an output signal from the position detector 20, the value of the speed signal Sv, which is a differential of the feedback signal Sf, changes from the value "0". When the absolute value |Sv| of the speed signal Sv becomes equal to or greater than the predetermined value Svr as detected by the speed detector 214, the switching signal Sb changes from the low level to the high level, thereby closing the switch 208 at the time t2. After the time t2, therefore, the pneumatic device 15 is actuated under the PID control mode.

If the transfer function changes, e.g., if the stem 18 is stopped owing to sliding friction when the output controlled variable happens to fail to change after the step 18 has started to move, e.g., at a time when the movement of the stem 18 becomes slow (a time after the time t2 and near the time t3), then since the I control mode has started at the time t2 before the stem 18 is stopped, the stopped stem 18 can be moved again under the I control mode.

Switching from the PD mode to the PID mode when the offset signal Sd is generated by the offset generator 207 will be described below.

First, in an open loop, i.e., with the output line of the position detector 20 being disconnected and the switch 208 being open, an offset value to compensate for the dead time of the pneumatic device 15, i.e., a dead time compensation offset value, is measured.

For measuring a dead time compensation offset value, the output signal from the PWM signal generator 218 is progressively increased from the time when the stem 18 is still in a given position, i.e., when the output signal from the position detector 20 is settled at a predetermined value and the output signal from the PWM signal generator 218 is nil. The value of the output signal from the PWM signal generator 218 when the output signal from the position detector 20 starts changing is measured. The measured value of the output signal from the PWM signal generator 218 is used as a dead time compensation offset value (=the offset signal Sd).

In the closed loop as shown in FIG. 4, a signal whose value changes from a time t10 to a time t50 (see FIG. 6) is supplied as the reference signal Sr to the comparator 200.

Specifically, the reference signal Sr whose value increases from 0% to 50% is supplied to the comparator 200 at the time t10 in order to change the opening of the flow control valve 40 (see FIG. 1) from a fully closed state to a half open state. It is assumed that the flow control valve 40 is fully closed when the value of the reference signal Sr is 0% and fully open when the value of the reference signal Sr is 100%.

For increasing the opening of the flow control valve 40 from the half open state by 1% at a time 20, the reference signal Sr whose value increases from 50% to 51% is supplied to the comparator 200.

For reducing the opening of the flow control valve 40 from 51% back to the half open state at a time 30, the reference signal Sr whose value decreases from 51% to 50% is supplied to the comparator 200.

For reducing the opening of the flow control valve 40 from the half open state to 49% at a time 40, the reference signal Sr whose value decreases from 50% to 49% is supplied to the comparator 200.

For increasing the opening of the flow control valve 40 from 49% back to the half open state at a time 50, the reference signal Sr whose value increases from 49% to 50% is supplied to the comparator 200.

The reference signal Sr corresponds to a relatively large manipulated variable (controlled variable) for the pneumatic device 15 at the time t10, and to relatively small manipulated variables (controlled variables) for the pneumatic device 15 at the times t20, t30, t40, t50.

Figure 6:
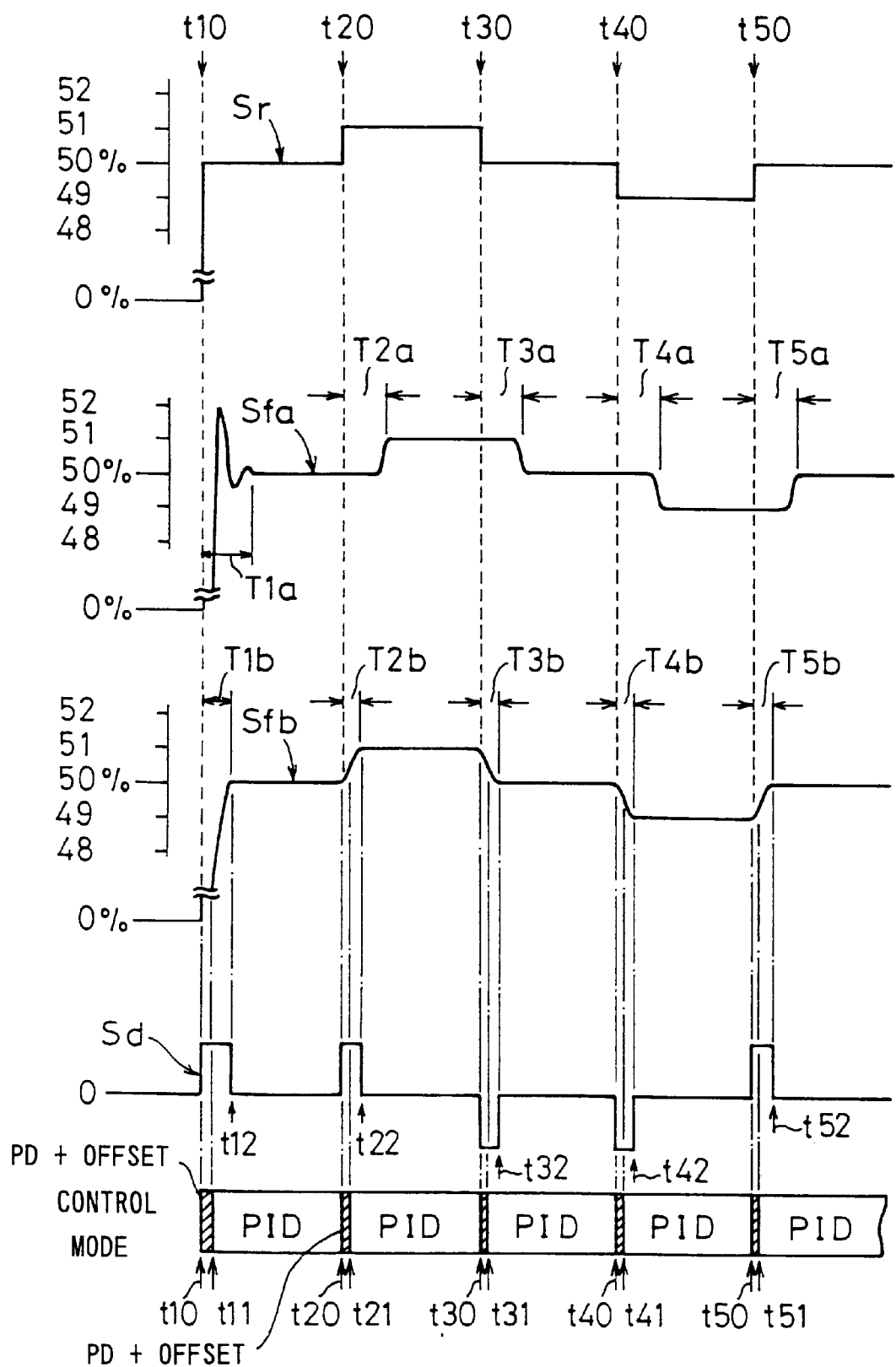
FIG. 6 is a diagram of waveforms illustrative of the manner in which the automatic pneumatic pressure control apparatus shown in FIG. 1 and the control system arrangement shown in FIG. 4 operate.

In FIG. 6, the reference characters Sfa represent the waveform of a feedback signal Sfa for no offset correction. For no offset correction, the switch 208 is closed and no offset signal Sd (Sd=0) is generated by the offset generator 207, and the pneumatic device 15 is controlled in the PID control mode.

The reference characters T1a–T5a combined with the feedback signal Sfa represent settling times required for the feedback signal Sfa to be stabilized at the value of the reference signal Sr (setpoint).

As can be seen from the feedback signal Sfa prior to being corrected, the opening of the flow control valve 40 suffers a large overshoot or a damped oscillation is large near the time t10 at which the manipulated variable (controlled variable) is relatively large, and a relatively long settling time T1a is needed before the overshoot or damped oscillation of the opening of the flow control valve 40 is settled. After the T20, no overshoot occurs, but long settling times T2a–T5a are required though the manipulated variable (controlled variable) is of a small value of 1%.

The reference character Sfb represents a feedback signal which is corrected according to the present invention by detecting the speed signal Sv to switch from the PD control mode to the PID control mode and adding the offset signal Sd.

At the time T10 when the switch 208 is open, the reference signal Sr is supplied to the comparator 200 and the error signal e (e≠0) is supplied as a trigger signal to the offset generator 207. The offset generator 207 now generates an offset signal Sd (see FIG. 6). Immediately after the time t10, the sum of a signal proportional to the reference signal Sr and the offset Sd is supplied as a manipulated variable through the PWM signal generator 218 to the pneumatic device 15.

In the switching between control modes illustrated at the bottom of FIG. 6, the PD control mode shown hatched at the left end, which is combined with the offset signal Sd, starts at the time t10. At the time t1 when the speed signal Sv exceeds the reference value Svr, the switch 208 is closed by the switching signal Sb, and the PD control mode switches to the PID control mode.

After the time t11, as shown in FIG. 6, the corrected feedback signal Sfb, i.e., the opening of the flow control valve 40, becomes smoothly settled. The error signal e becomes nil (e=0), preventing the offset signal Sd from being generated (Sd=0) at a time t12. The time required for the feedback signal Sfb to be settled to 50% is a settling time T1b, which is shorter than the settling time T1a prior to the correction of the feedback signal (T1b<T1a). According to this embodiment, therefore, insofar as the manipulated variable (controlled variable) for the pneumatic device 15 is large, the settling time is short, and the waveform distortion (overshoot or damping oscillation) is suppressed.

When the reference signal Sr changes from 50% to 51% by a small value of 1% at the time t20, the offset signal Sd is generated at the time t20, and added to the manipulated variable based on the reference signal Sr by the adder 205. The sum is supplied through the PWM signal generator 218 to the pneumatic device 15.

Since the offset signal Sd is added to the manipulated variable based on the reference signal Sr, a settling time T2b after the correction of the feedback signal is considerably shorter than the settling time T2$a$ prior to the correction of the feedback signal as indicated near the time t20 for the corrected feedback signal Sfb (T2$b$<<T2$a$). Therefore, when the manipulated variable (controlled variable) for the pneumatic device 15 is small, the settling time is made very short, i.e., the response of the pneumatic device 15 is made very quick. Operation from the time t30 to the time t50 is essentially the same as the operation at the time t20 when the manipulated variable is small, and will not be described below.

In the above embodiment, an offset for compensating for the dead time of the pneumatic device 15 as a controlled object is measured in advance, and when a manipulated variable is to be supplied to the pneumatic device 15, the measured offset is added to a manipulated variable as a setpoint, and the sum is supplied to the pneumatic device 15. Consequently, when the manipulated variable (controlled variable) for the pneumatic device 15 with the dead time is small, the time for the pneumatic device 15 to respond until the controlled variable is settled is made highly short, i.e., the response of the pneumatic device 15 is made quick. When the manipulated variable (controlled variable) for the pneumatic device 15 with the dead time is large, the pneumatic device 15 suffers substantially no overshoot or damped oscillation, and the time for settling the controlled variable is short.

Figure 7:
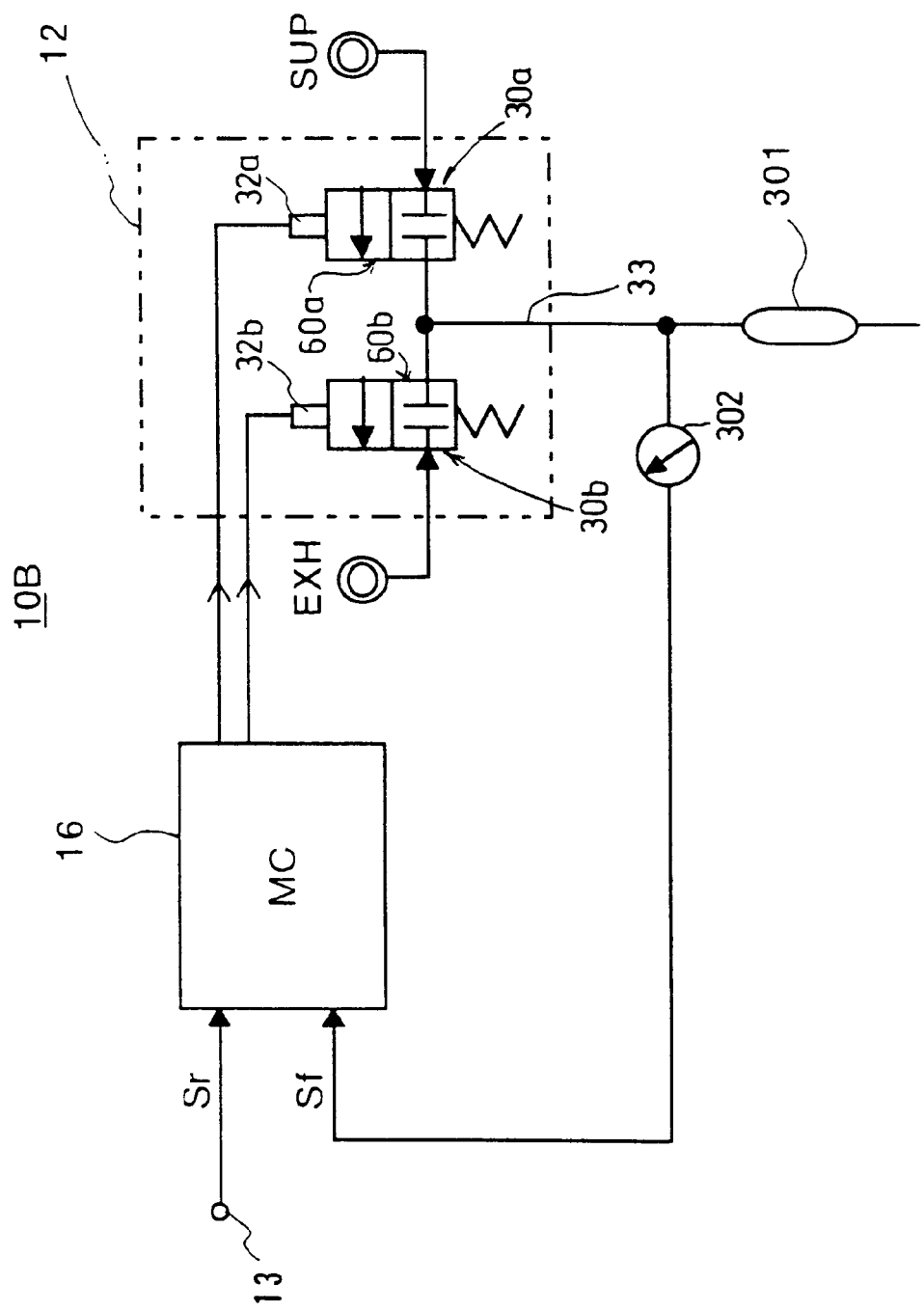
FIG. 7 is a circuit diagram, partly in block form, an automatic pneumatic pressure control apparatus according to another embodiment of the present invention.

FIG. 7 shows an automatic pneumatic pressure control apparatus 10B according to another embodiment of the present invention, which incorporates an electropneumatic transducer 12 as a pneumatic device. The automatic pneumatic pressure control apparatus 10B differs from the automatic pneumatic pressure control apparatus 10 shown in FIG. 1 in that the pneumatic actuator 14 is replaced with a pneumatic tank 301, the pneumatic pressure in the pneumatic tank 301 is measured by a pressure gauge 302, and an electric output signal from the pressure gauge 302 is supplied as a feedback signal Sf to the microcomputer 16. The automatic pneumatic pressure control apparatus 10B has a control system arrangement which is the same as those shown in FIG. 4, and can be operated with a different offset signal Sd, different proportional gains, or a different reference value Svr.

According to the present invention, as described above, a quantity corresponding to the dead time of a pneumatic device as a controlled object is added to a manipulated variable for controlling the pneumatic device. Therefore, when a controlled variable is small, the time for the pneumatic device to respond is short, i.e., the dead time of the pneumatic device is minimized, and when the controlled variable is large, the settling time is short, and the pneumatic device responds smoothly substantially free of any overshoot or damped oscillation.

As a consequence, the principles of the present invention are applicable to optimally controlling a pneumatic device which has a large dead time and tends to suffer a damped oscillation.

If only one type of pneumatic devices is to be controlled, then one type of offsets may be stored as percentages so that an offset depending on the amplitude of a manipulated variable can be supplied to the pneumatic device.

Furthermore, when a change occurs in the speed of the output controlled variable, the P control mode or the PD control mode switches to the PID control mode. Therefore, an overshoot or damped oscillation can be reduced to a greater degree. Since the speed, rather than an error, is detected to change the P control mode or the PD control mode to the PID control mode, the present invention can flexibly handle the controlled object even when the signal transfer characteristics of the pneumatic device is changed while the pneumatic device is being controlled.

Specifically, if the transfer function changes, e.g., if the output control variable of the controlled object happens to fail to change due to, for example, the stoppage of a valve body owing to sliding friction or the shutdown of an actuator, then the I control mode has started before the transfer function changes or the valve body or the actuator is stopped. Therefore, even when transfer function changes or the valve body or the actuator is stopped, the manipulated variable progressively increases, and the controlled variable can be changed again, i.e., the stopped valve body or the actuator can be moved again under the I control mode.

Although certain preferred embodiments of the present invention have been shown and described in detail, it should be understood that various changes and modifications may be made therein without departing from the scope of the appended claims.

What is claimed is:

1. A method of controlling an automatic pneumatic pressure control apparatus which detects, with a detector, an output controlled variable from a pneumatic device actuated by a manipulated variable supplied as an electric signal, converts the output controlled variable into a feedback quantity as an electric signal, and automatically controls the pneumatic device depending on an error based on the feedback quantity and a reference signal, comprising the steps of:

determining in advance an offset value for compensating for a dead time of the pneumatic device corresponding to the manipulated variable; and adding said offset value to said manipulated variable through an adder to produce a sum, and supplying the sum as side electric signal to control the pneumatic device.

2. A method of controlling an automatic pneumatic pressure control apparatus which detects, with a detector, an output controlled variable from a pneumatic device actuated by a manipulated variable supplied as an electric signal, converts the output controlled variable into a feedback quantity as an electric signal, and automatically controls the pneumatic device depending on an error based on the feedback quantity and a reference signal, comprising the steps of:

determining in advance an offset for compensating for a dead time of the pneumatic device corresponding to the manipulated variable;

changing said reference signal stepwise from a first value to a second value to change the output controlled variable from said pneumatic device from a given value to a desired value;

adding said offset to a manipulated variable in a P control mode to produce a sum and supplying the sum to the pneumatic device when said reference signal changes stepwise from the first value to the second value; and switching from said P control mode to a PID control mode and supplying a manipulated variable in the PID control mode to said pneumatic device when a differential of said output controlled variable reaches a predetermined value after said reference signal has changed stepwise from the first value to the second value.

3. A method according to claim 2, wherein said P control mode is replaced with a PD control mode.

4. A method according to claim 1, wherein said pneumatic device comprises an electropneumatic transducer, and said output controlled variable comprises a pressure.

5. A method according to claim 2, wherein said pneumatic device comprises an electropneumatic transducer, and said output controlled variable comprises a pressure.

6. A method according to claim 3, wherein said pneumatic device comprises an electropneumatic transducer, and said output controlled variable comprises a pressure.

7. A method according to claim 1, wherein said pneumatic device comprises an electropneumatic transducer and an actuator controlled by an output pressure produced by said electropneumatic transducer, and said output controlled variable comprises an output quantity produced by said actuator.

8. A method according to claim 2, wherein said pneumatic device comprises an electropneumatic transducer and an actuator controlled by an output pressure produced by said electropneumatic transducer, and said output controlled variable comprises an output quantity produced by said actuator.

9. A method according to claim 3, wherein said pneumatic device comprises an electropneumatic transducer and an actuator controlled by an output pressure produced by said electropneumatic transducer, and said output controlled variable comprises an output quantity produced by said actuator.

10. A method according to claim 7, wherein said actuator comprises a flow control valve.

11. A method according to claim 8, wherein said actuator comprises a flow control valve.

12. A method according to claim 9, wherein said actuator comprises a flow control valve.

13. An automatic pneumatic pressure control apparatus comprising:

subtracting means for being supplied with a reference signal representing to a setpoint and a feedback signal as a subtracting signal;

PI control means for being supplied with an output signal from said subtracting means;

D control means for being supplied with said feedback signal;

adding means for adding an output signal from said PI control means, an output signal from said D control means, and an offset signal;

an electropneumatic transducer for being supplied with an output signal from said adding means as a manipulated variable;

a pneumatic actuator for being supplied with an output pneumatic pressure from said electropneumatic transducer; and position detecting means for converting a displacement of said pneumatic actuator into said feedback signal as an electric signal;

said offset signal having a value to compensate for a dead time of a controlled object which comprises said electropneumatic transducer and said pneumatic actuator.

14. An automatic pneumatic pressure control apparatus according to claim 13, further comprising:

monitoring means for monitoring the output signal from said D control means through comparison with a predetermined value;

said monitoring means comprising:

means for setting an output signal from I control means, of the output signal from said PI control means, to a zero value, and supplying an output signal from P control means to said adding means after said reference signal is supplied to said subtracting means until the output signal from said D control means (206) reaches a predetermined value; and means for supplying the output signal from I control means and the output signal from P control means to said adding means after the output signal from said D control means reaches said predetermined value.

15. An automatic pneumatic pressure control apparatus according to claim 13, wherein said pneumatic actuator comprises a flow control valve.

16. An automatic pneumatic pressure control apparatus according to claim 14, wherein said pneumatic actuator comprises a flow control valve.

* * * * *